(12) United States Patent
Singhal

(10) Patent No.: US 8,229,799 B2
(45) Date of Patent: Jul. 24, 2012

(54) SYSTEM AND METHOD FOR SIMULATING APPAREL FIT WHILE MAINTAINING CUSTOMER PRIVACY ON A GLOBAL COMPUTER NETWORK

(76) Inventor: Tara Chand Singhal, Torrance, CA (US)

( * ) Notice: Subject to any disclaimer, the term of this patent is extended or adjusted under 35 U.S.C. 154(b) by 803 days.

(21) Appl. No.: 10/951,246

(22) Filed: Sep. 26, 2004

(65) Prior Publication Data

US 2005/0071256 A1 Mar. 31, 2005

(51) Int. Cl.
*G06Q 30/00* (2006.01)
(52) U.S. Cl. .............. 705/27.2; 705/26.1; 705/26.61; 705/26.63; 705/27.1
(58) Field of Classification Search ............ 705/26, 705/26.1–27.2
See application file for complete search history.

(56) References Cited

U.S. PATENT DOCUMENTS

| | | | |
|---|---|---|---|
| 5,930,769 A * | 7/1999 | Rose ........................ 705/27 |
| 2001/0026272 A1* | 10/2001 | Feld et al. ................ 345/419 |
| 2001/0037191 A1* | 11/2001 | Furuta et al. ............. 703/6 |
| 2002/0138170 A1* | 9/2002 | Onyshkevych et al. .... 700/130 |
| 2003/0065589 A1* | 4/2003 | Giacchetti ................ 705/27 |
| 2003/0101105 A1* | 5/2003 | Vock ....................... 705/27 |

OTHER PUBLICATIONS

"If That's Me in the E-Dressing Room, Why Doesn't This Fit?" Stacy Kravetz. New York Times. (Late Edition (East Coast)). New York, NY: Sep. 20, 2000. p. H.22. Retrieved via ProQuest.*

* cited by examiner

*Primary Examiner* — Michael Misiaszek
(74) *Attorney, Agent, or Firm* — Steve Roeder, Esq.

(57) ABSTRACT

A wear apparel fit system on a global computer network enables, the apparel designer to provide apparel data to the fit system, a merchant interface that enables the apparel data to be embedded in a merchant's prior art apparel web pages, a customer of the apparel merchant, using a client computer connected to the global computer network with the ability to shop the apparel merchants display an apparel web page. The web page has a Try-it-on link displayed next to the display of the apparel on the merchant's web page that retrieves a fit program from a third party server, executes the fit program in the client and displays web pages, to try on the apparel for fit using visual color coded indicators overlaid over a wire line image of the customer. The fit system provides privacy to customer by not using a central database system for customer data.

30 Claims, 13 Drawing Sheets

Flow Diagram

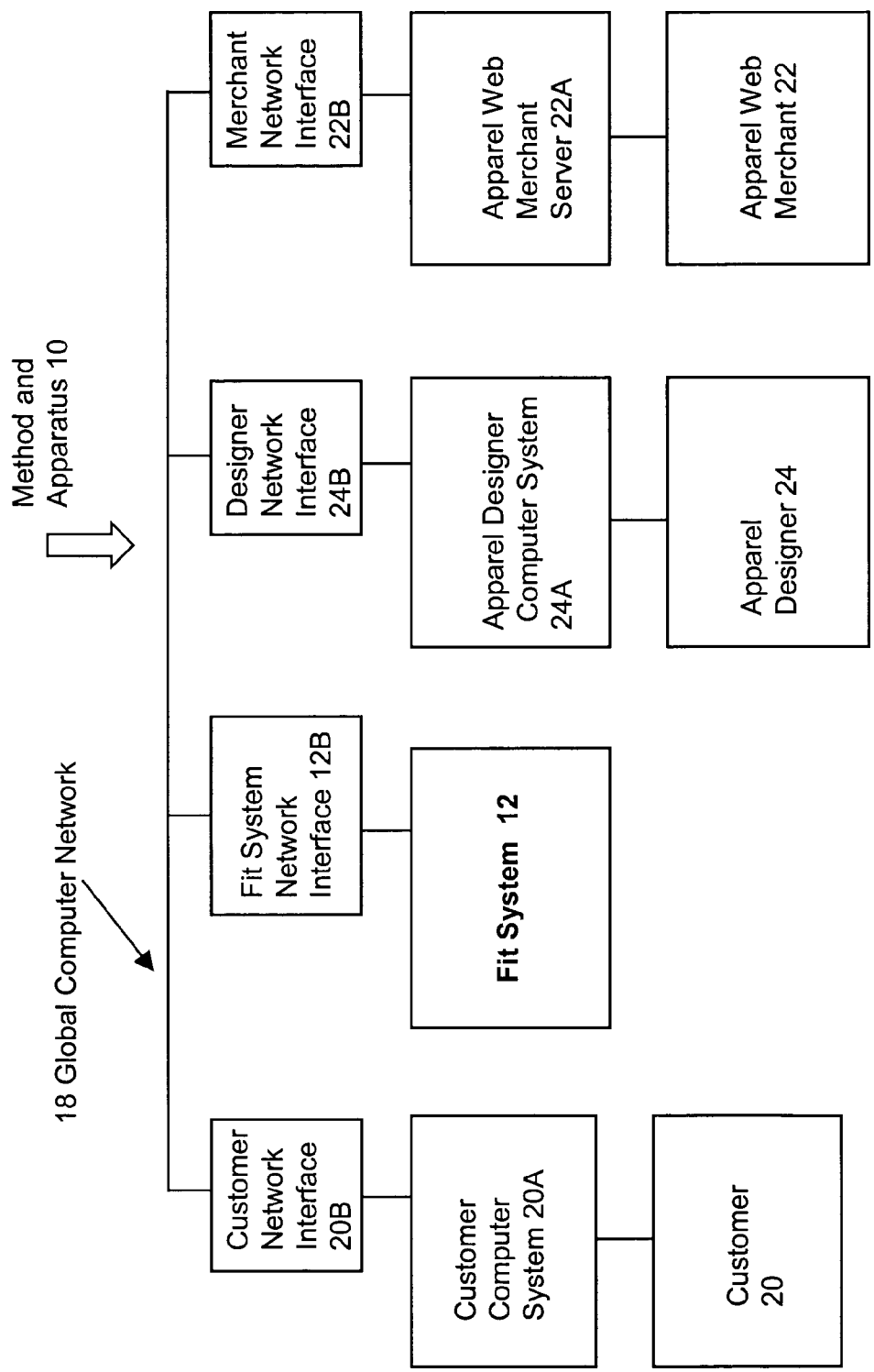
FIGURE 1A: Fit System on Global Network

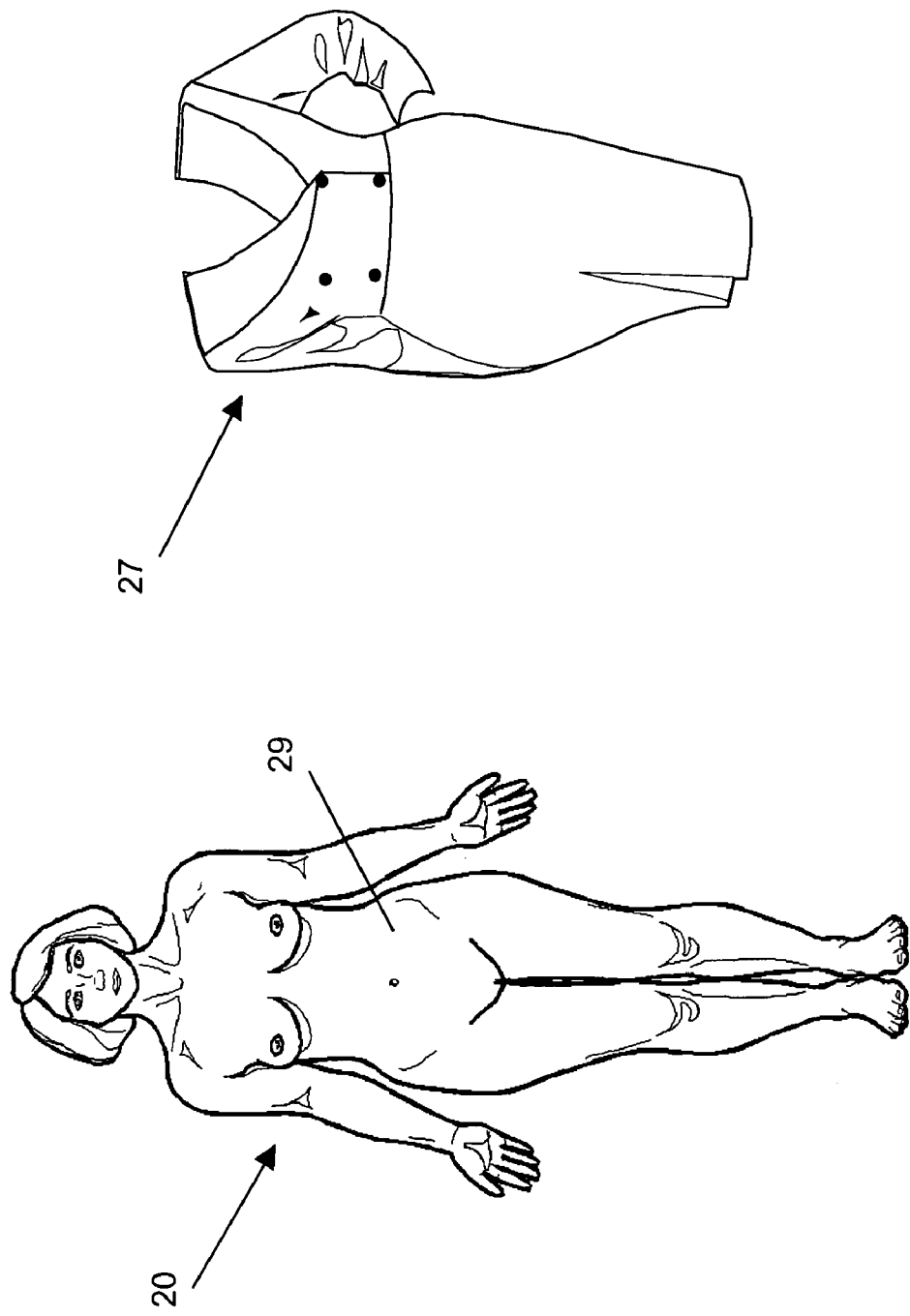
FIGURE 1B: Trying on Apparel for Size Fit

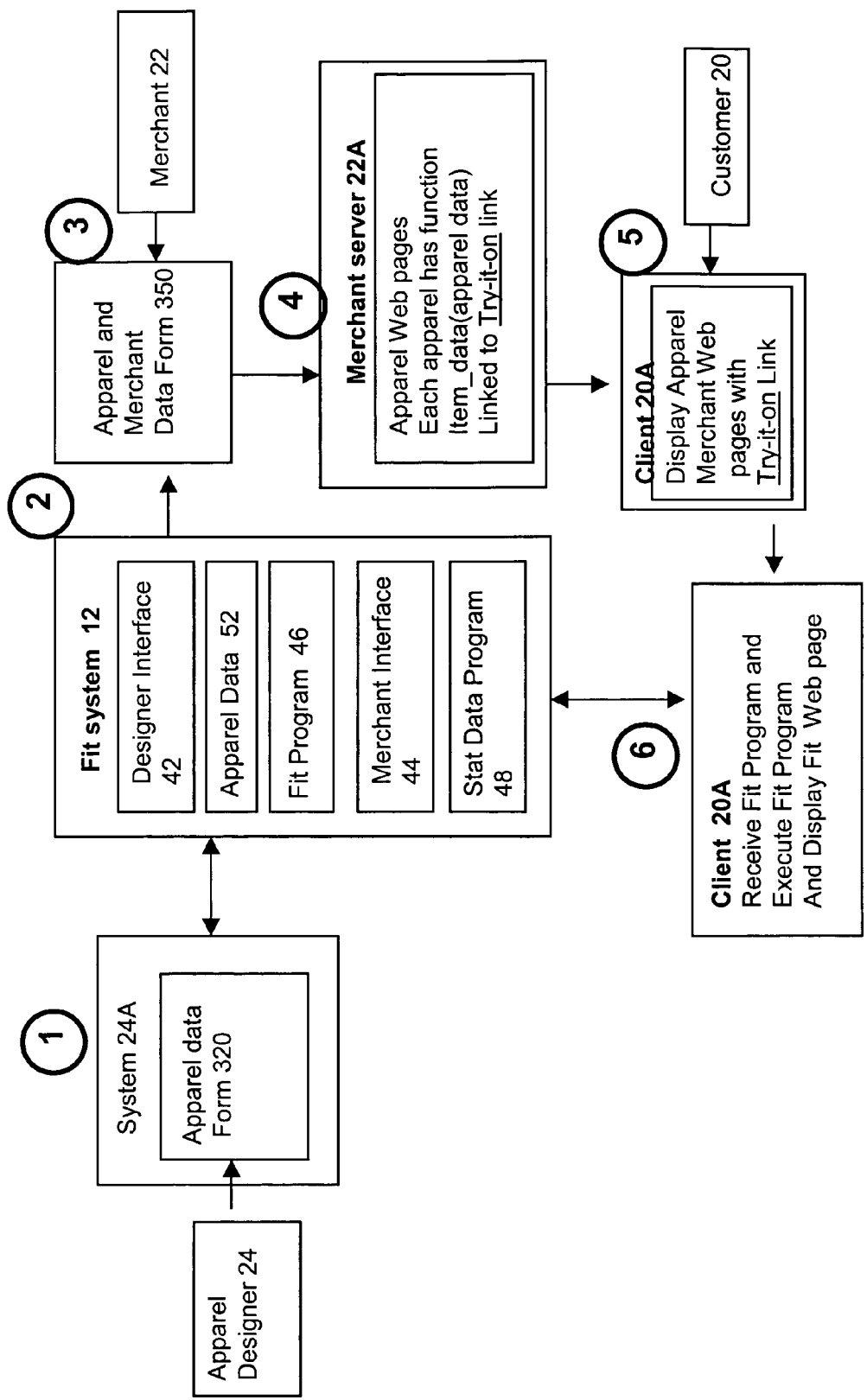
FIGURE 1C: Flow Diagram

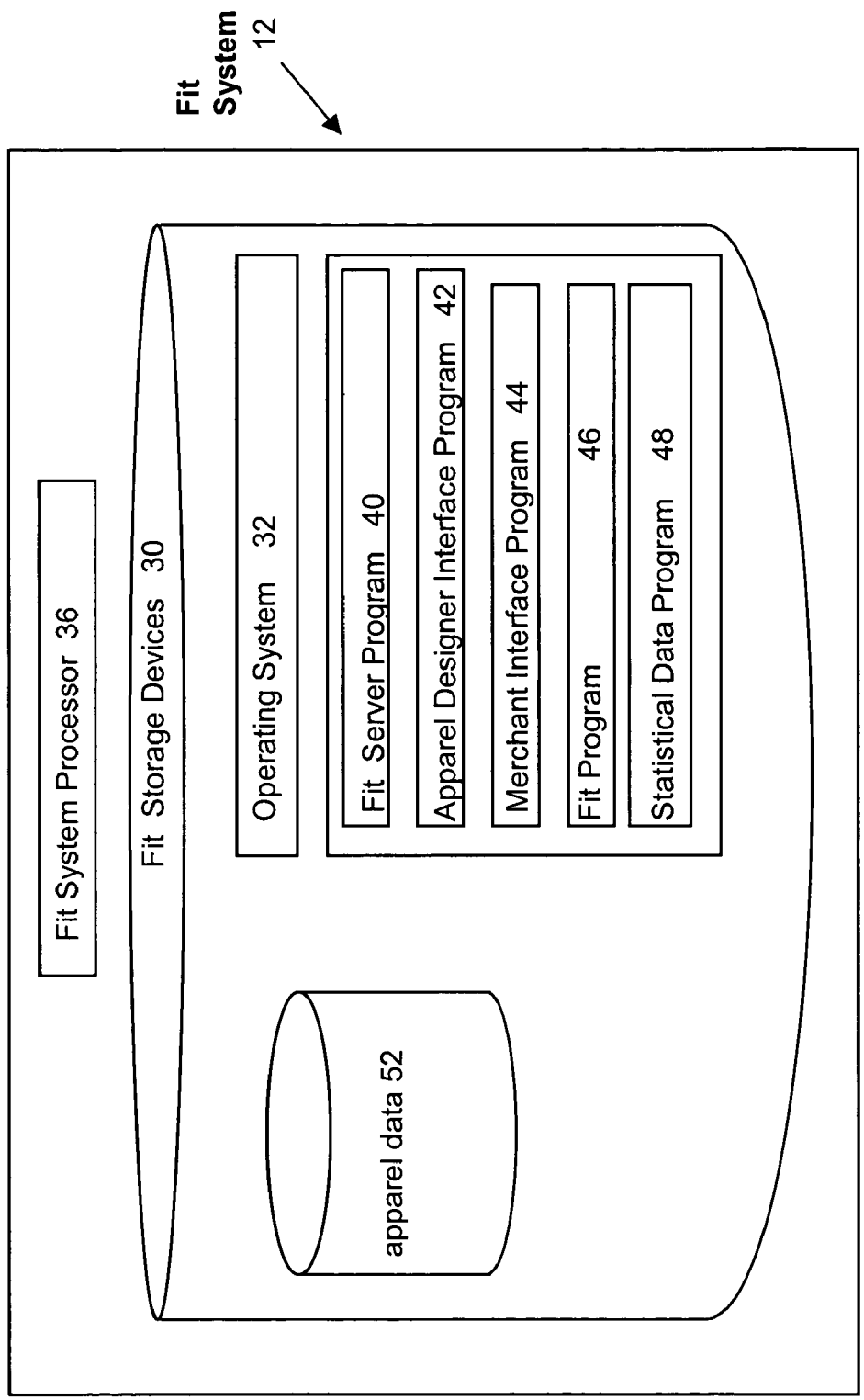
FIGURE 2: Fit System

Fit System Web page 300

Designer Log in 302

User id: [ ]  Password: [ ]

Merchant Log In 304

User id: [ ]  Password: [ ]

Apparel Data 305

| Designer 306 | Brand 308 | Apparel Type 310 | Gender 312 | File_ID 314 |
|---|---|---|---|---|
| DKNY<br>DKNY | Suave<br>Suave | Jean<br>dress | Men<br>Women | D435678_1<br>D4356789_2 |
| Acme<br>Acme | Matrix<br>matrix | Shirt<br>Pant | Women<br>Unisex | A4555099_1<br>A457788_2 |
| ... | ... | ... | | |

CREATE 316

FIGURE 3A: Summary Apparel Data Form

Designer Apparel Data Form 320

| File ID: D435678_1  314 | | Image1 322A |
|---|---|---|
| Brand: Matrix 308  Type: Shirt  310  Gender: Female 312 | | |
| # of Colors: 4  324  Color names: color 1, color 2, color 3, color 4  326 | | Image2 322B |
| # of Sizes: 4  328  Size names: small, medium, large, xlarge  330 | | |
| Apparel Description: 332 | | Image3 322C |

| Apparel Size and Fit Data 334 | Fabric: Cotton 336 | |
|---|---|---|
| Small 340 | Size 342 | Fit_Range 344 |
| Neck  346 | 6 | 0.5-1.0 |
| Shoulder | 22 | 4.0-6.5 |
| Chest | 16 | 6.0-8.0 |
| Waist | 18 | 3.0-4.0 |
| Waist L | 24 | 2.5-5.5 |
| Arm | 7.5 | 1.5-2.5 |
| Arm L | 7 | 1.0-2.0 |
| Medium 340B | | |
| Large 340B | | |
| X-Large 340C | | |

UPDATE/SAVE 348

FIGURE 3B: Apparel Designer Data Form

Merchant Apparel Data Form 350

| |
|---|
| File_ID 314: D435678_1 |
| Designer 306: ACME   Brand 308: Matrix   Type 310: tShirt   Gender 312: Female |
| # of Colors 324: 4   Color names 326: color 1, color 2, color 3, color 4 |
| # of Sizes 328: 4   Size names 330: small, medium, large, xlarge |
| Apparel Description 332: |
| Fabric 336:   Cotton |
| Merchant: [Acme] 352  Inventory_ID: [N0001] 354  Price: [$29.95] 356 |
| Page: [http://www.merchant.com/sports/tshorts3] 358   EMBED 360 |
| 362 → `<a href="javascript:apparel_data('merchant_name','male','tshirt','Novelty', 'N001','Cotton' 'http://www.merchant.com/images/shirt_front.jpeg','4','small','05.5-0.5-1.5;16.5-2.5-5.5;12.5-1.5-3.5;12.5-2.5-3.5;22.0-1.5-4.5;20.0-2.5-3.5','medium', '05.5-0.5-1.5;16.5-2.5-5.5;12.5-1.5-3.5;12.5-2.5-3.5;22.0-1.5-4.5;20.0-2.5-3.5','large', '05.5-0.5-1.5;16.5-2.5-5.5;12.5-1.5-3.5;12.5-2.5-3.5;22.0-1.5-4.5;20.0-2.5-3.5','Xlarge', '05.5-0.5-1.5;16.5-2.5-5.5;12.5-1.5-3.5;12.5-2.5-3.5;22.0-1.5-4.5;20.0-2.5-3.5')" title="Click here to Try On and select the right size" src="images/tryiton.gif" width="78" border="0" align="absmiddle"` `</a>` |
| Image2 322 |

FIGURE 3C: Apparel Merchant Data Form

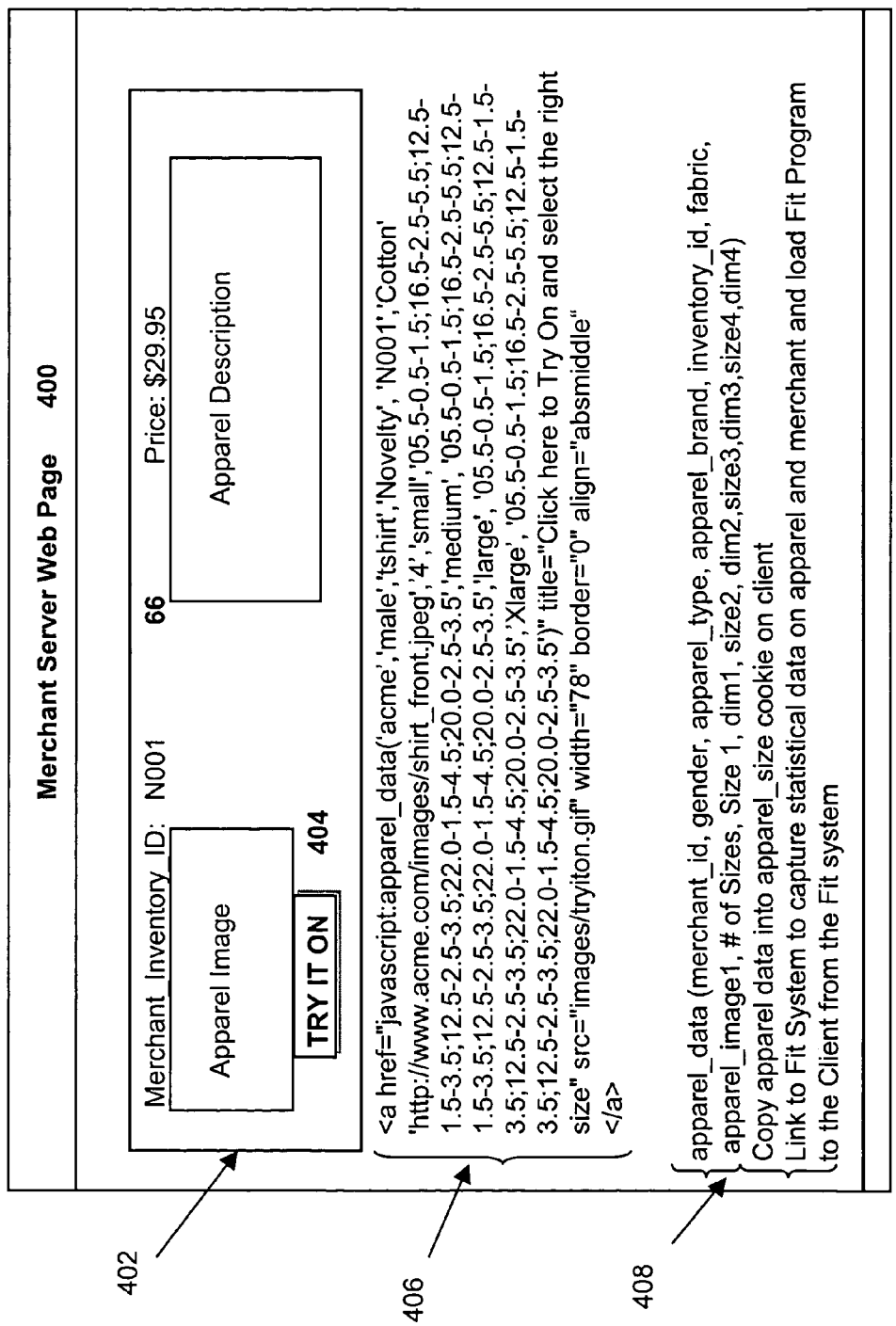
FIGURE 4: Merchant Apparel Display Web page

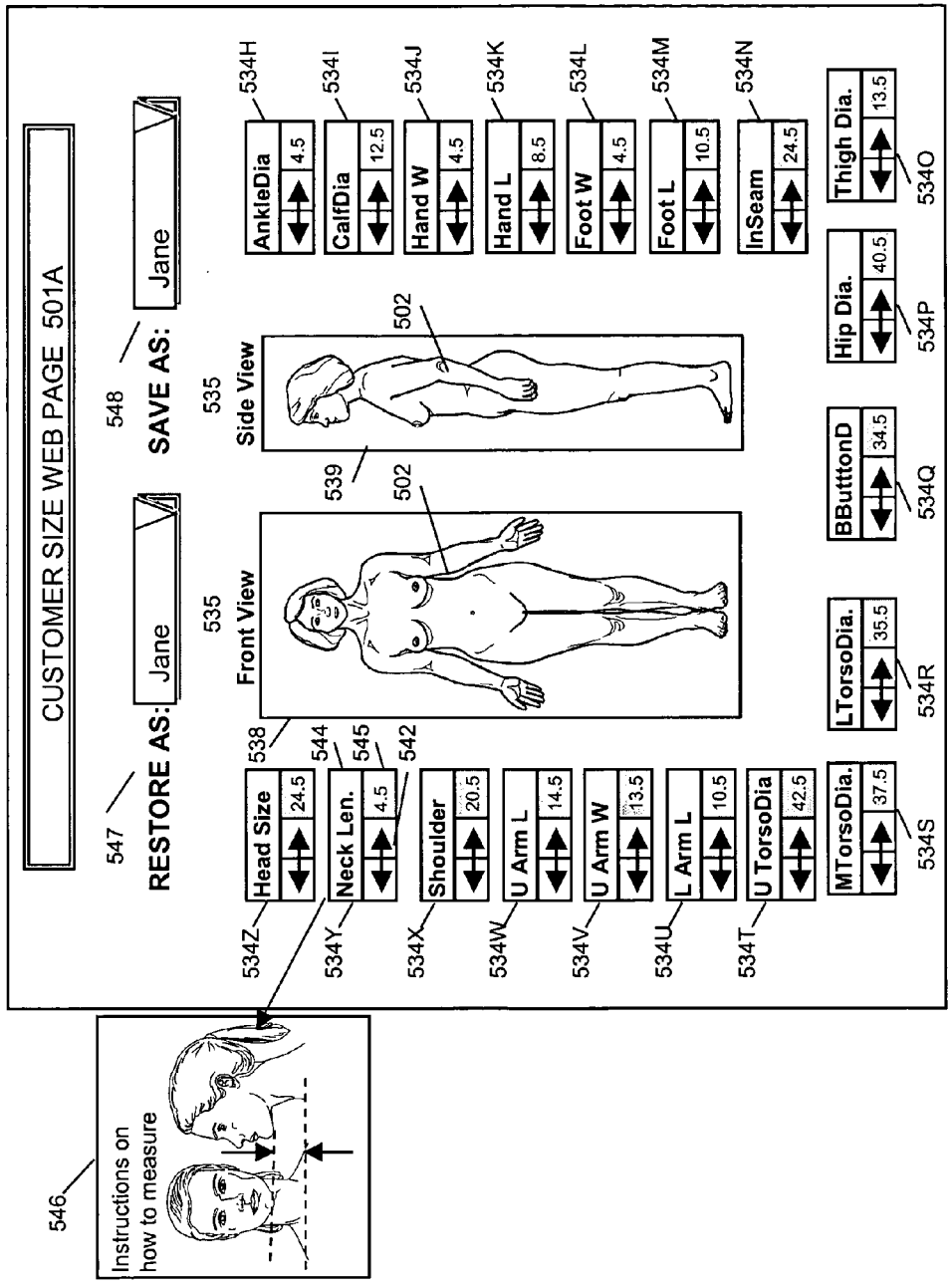
FIGURE 5A: Fit Program Web Page

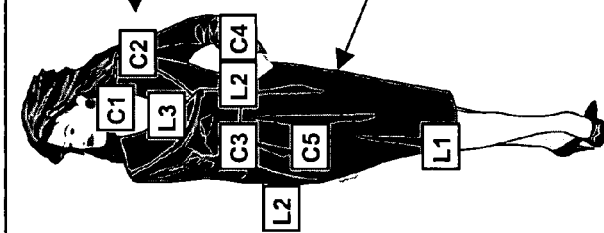
FIGURE 5B: Fit Program Web page

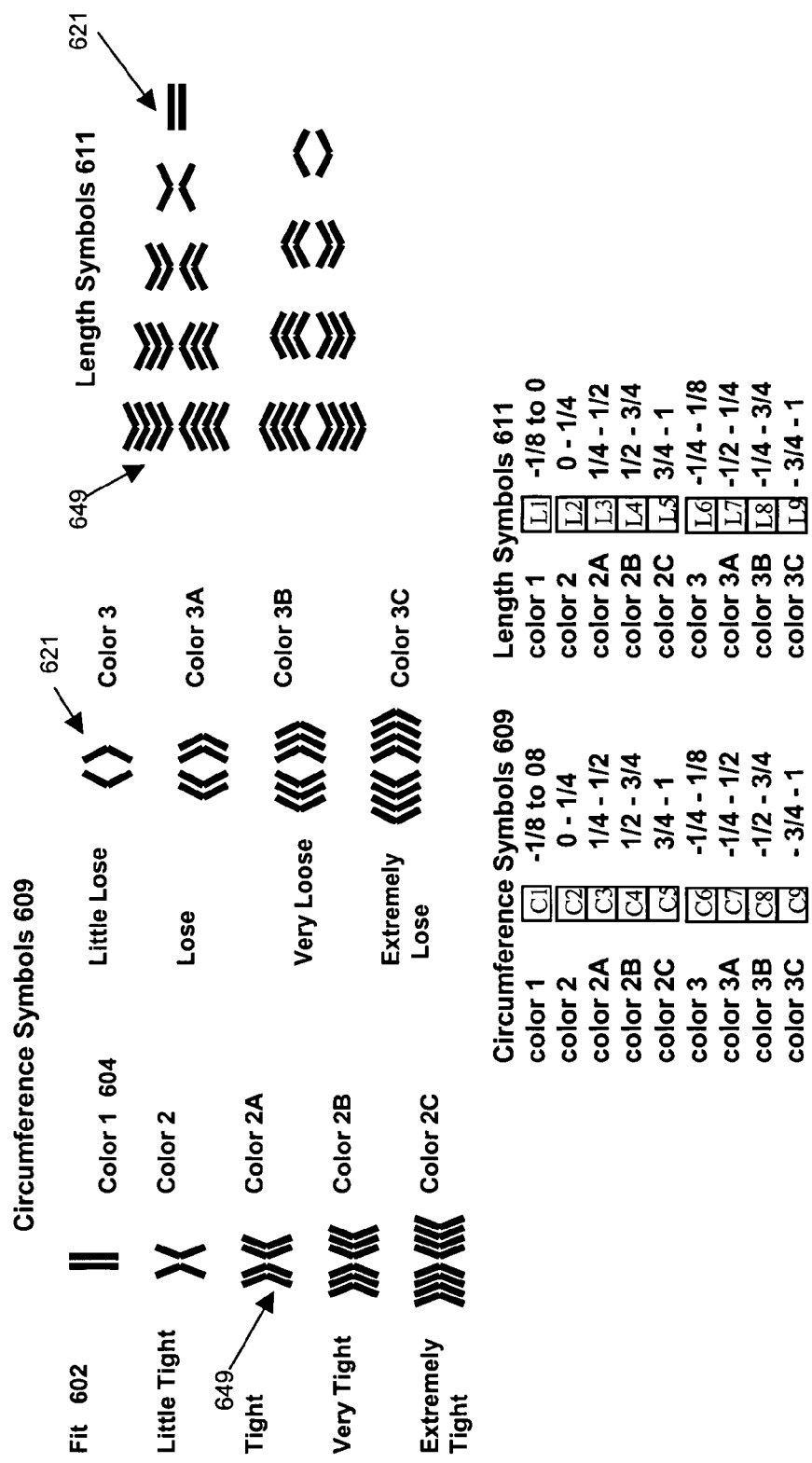
FIGURE 6: Fit Indicators

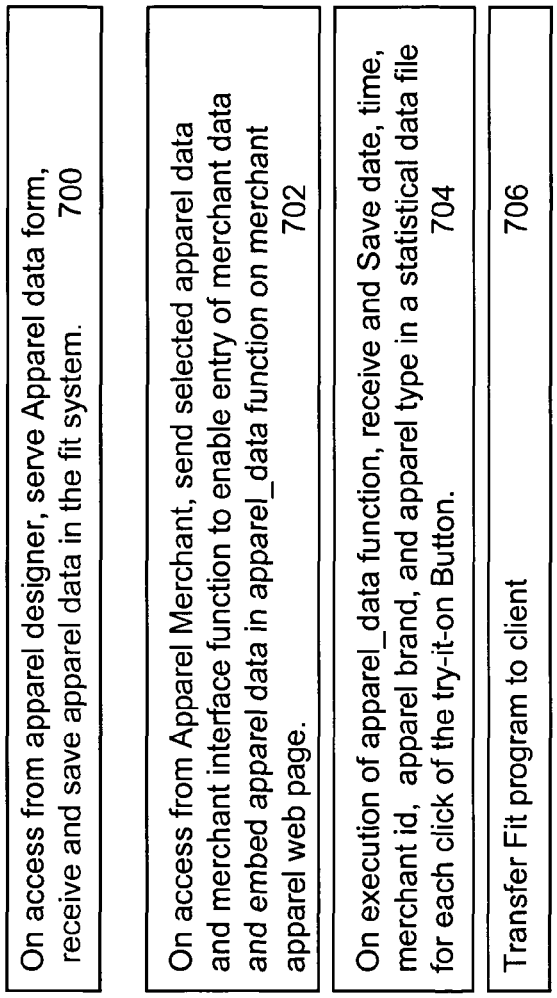
FIGURE 7A: Fit Server Program
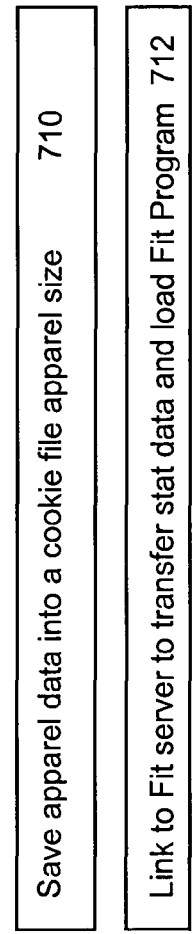
FIGURE 7B: Apparel_Data Function

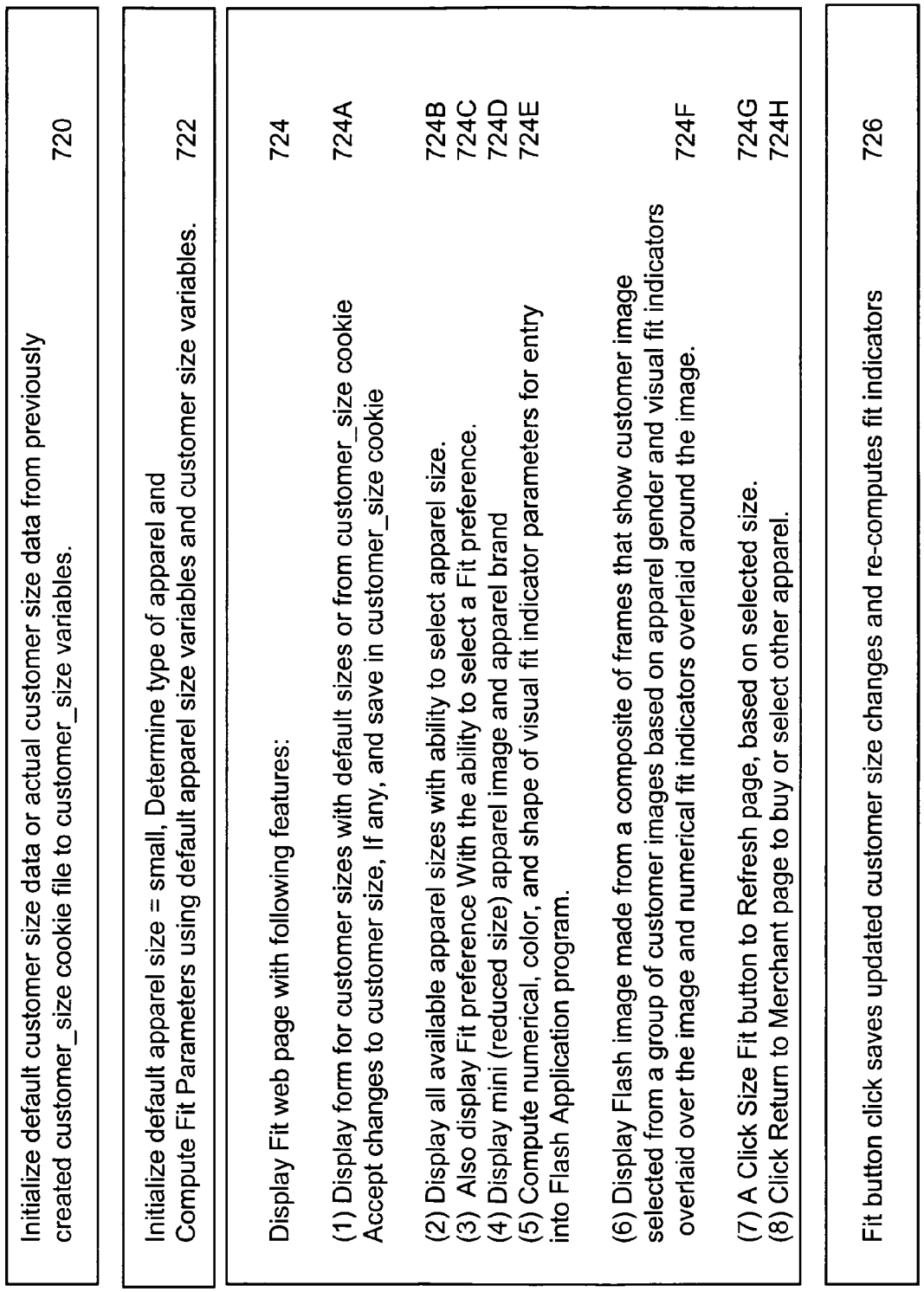
FIGURE 7C: Fit Program

SYSTEM AND METHOD FOR SIMULATING APPAREL FIT WHILE MAINTAINING CUSTOMER PRIVACY ON A GLOBAL COMPUTER NETWORK

CROSS REFERENCE TO RELATED APPLICATIONS

This application claims priority on Provisional Application Ser. No. 60/506,519, entitled "E-Commerce System Related To Wear Apparel" filed on Sep. 27, 2003, by Tara Chand Singhal. The contents of the Provisional Application Ser. No. 60/506,519 are incorporated herein by reference.

FIELD OF THE INVENTION

The present invention is directed to methods and apparatus that enable an apparel designer to provide apparel data to an apparel web merchant and enable a customer to try on apparel for size fit from the apparel web merchants before making a purchase decision.

BACKGROUND

Apparel designers design new wear apparel in various sizes based on the sizes of the potential customers. The designers sell the apparel designs to apparel retailers and, based on the orders from retailers, have the apparel manufactured by an apparel manufacturer. Sometimes, the designer and the apparel manufacturer are the same entity.

When the apparel retailers make the apparel available to their customers, the customers try the apparel for fit to determine among other things, how well the apparel fits on them and decide which one of the available sizes offered is the best fit among the various sizes, before making a purchase decision. Each brand and design of apparel is designed and cut differently and there is no uniformity in sizes from different designers and different brands from the same designer as to how a particular size will fit on a customer. Hence for this reason, customers usually choose to try on the apparel for size fit before making a purchase decision. The customers try the apparel in the fitting rooms of the retailer.

Customers are also increasingly using the Internet to view apparel and their available sizes and colors and are also making purchase decisions. However, the Internet does not permit the customer to actually try on a apparel for fit before making a purchase decision as would the customer in the fitting room of an apparel retailer before deciding which one of the available sizes is the best or optimum fit or is not a good fit. This affects the growth of e-commerce related to wear apparel as the Internet based e-commerce offers many benefits that the web shoppers and the web merchants find desirable such as convenience for the shoppers and economical for the merchant.

In the past, there may have been attempts by others to provide solutions and or technology that would enable the customer to select the size of the apparel that would be the best fit. However such attempts may not have been successful due to a variety of reasons, such as, cost of developing and using such a system by apparel merchants and the necessity of collecting personal data of the shoppers to be able to try on the apparel for fit.

Therefore, it is an objective of the present invention to provide an apparel fit system on the global computer network that (i) minimizes the cost and effort of merchants to use and deploy apparel fit system for use by their customers and (ii) enables customers to try on an apparel for size fit without divulging private and personal data to the merchant.

SUMMARY

This invention discloses a fit system that provides (i) a means for the merchant to display web pages related to apparel that enable a shopper to try on the displayed apparel for size fit and (ii) a means for the customer to try on an apparel for size fit without providing any personal data to the apparel merchant and without providing personal data to any data server anywhere.

The fit system of this invention on a global computer network enables:

(i) the apparel designer to provide apparel data to the fit system,
(ii) a merchant interface function that enables the apparel data to be made available to the merchant's server displaying prior art apparel web pages,
(iii) a customer of the apparel merchant, using a client computer connected to the global computer network, select an apparel from a web site, clicks a Try-it-on link displayed in the vicinity of the apparel item display on the merchant's web page to execute a fit program in the client that displays a fit web page, and
(iv) a customer interface function that enables the customer to interact with the features of the Fit web page to be able to provide customer size data and select the apparel size, fit preference and be displayed images overlaid with numerical and visual fit indicators that enable the customer to judge the fitting of the available sizes of the apparel.

BRIEF DESCRIPTION OF DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a block diagram that illustrates an apparatus and method having features of the present invention;

FIG. 1B is a front plan view of a customer and an article of wear;

FIG. 1C is an illustration of the operational flow diagram;

FIG. 2 is a block diagram that illustrates a fit system having features of the present invention;

FIG. 3A-C are block diagrams that illustrates apparel data forms having features of the present invention;

FIG. 4 is a block diagram that illustrates an apparel web page of the merchant having features of the present invention;

FIG. 5A is a simplified illustration of a fit web page feature enabling entry of customer size data having features of the present invention;

FIG. 5B is a simplified illustration of a fit web page having feature of a body image with fit indicators having features of the present invention;

FIG. 6 is a simplified illustration of plurality of alternate visual indicators having features of the present invention;

FIG. 7A is a simplified flow chart of Fit Server program having features of the present invention;

FIG. 7B is a flow chart that illustrates the Apparel data function having features of the present invention; and FIG. 7C is a flow chart that illustrates the Fit program that generates a Fit web page having some of the features of the present invention.

DESCRIPTION

Introduction

An apparel designer designs the apparel and hence is the best entity to have the knowledge about the size and the fit of the apparel. The knowledge about the apparel includes the various colors, designs and patterns in which the apparel will be available, the various sizes the apparel would be available, and for each size the actual dimensions of the apparel and for each dimension the optimum fit for that dimension.

To illustrate the concept of optimum fit, a term fit-range is coined in this invention. The term fit-range enables identification of the apparel for the type of fit intended by the designer. For example, some apparel are designed to be worn skintight while others are designed to be worn as loose fit. The fit-range may be different for each dimension of the apparel and may be different for different apparel. For example, for young women generally, apparel are designed to be worn skintight and apparel for others such as elderly women and men are designed to be worn as loose fit or comfortable fit. The fit-range and its use in this invention is described in more detail later.

An apparel merchant makes the apparel available to a retail customer and does not have detailed knowledge of the apparel fit, leaving the apparel fit to be decided by the customer after trying on the available sizes. Many times, a size chart as an aid to the customer is made available which identifies the various sizes of the apparel and one or two dimensions of the customer for which the particular size is the best fit. However this is provided as a guide for the customer to initially select a size and does not provide information on how a particular size would fit on the customer.

With reference to FIG. 1A, the fit system 12 on the global network 18 can be accessed by a merchant 22, a customer 20, and an apparel designer 24 via their respective computer systems interfaced to the global computer network 18 via their respective network interfaces. FIG. 1B shows a human body 29 of customer 20 and wear apparel 27, which is being fitted on the human body on the global network.

FIG. 1C, illustrates the operational steps of the invention. Not all steps may be necessary and performed in the order described here. The steps are highlighted by circled numerals and are described as follows:

In Step 1, the apparel designer 24 fills out an apparel data form 320 (described later with reference to FIG. 3) to make the apparel data 52 available to the fit system 12.

In Step 2, the merchant 22 connects to the fit system 12 selects the apparel, and is displayed the apparel data form 350 with the apparel data, which the merchant either already sells on his/her web page or desires to sell on his/her web page.

In Step 3, the merchant 22 enters in the partially filled apparel data form, additional data such as, merchant name, inventory id, retail price, and the identification of the web page. The web page is the web page in the merchant server in which the apparel is already displayed or is intended to be displayed to the customer.

In Step 4, an embed function, when clicked in the apparel data form by the merchant, transfers the apparel data from the form and embeds it in the web page under a link try-it-on next to the display of the apparel.

In Step 5, the customer of merchant is shopping the merchant and is looking at one or more of the web pages displaying the apparel. Each apparel has a try-it-on link next to it.

In Step 6, the customer clicks the try-it-on link, which enables a fit page to be displayed to the customer. The Fit web page enables the customer to try on the available apparel sizes. The customer after knowing the right size can return to the merchant web page from the fit page and proceed further to either try on another apparel or buy the apparel using the merchant's e-commerce payment options.

These and other aspects of the invention are described here in detail. The headings are provided for reader convenience.

Fit System 12

Referring to FIG. 2, the fit system 12 includes (i) a fit storage device 30, (ii) a fit operating system 32 stored in the fit storage device 30, (iii) a fit server program 40 stored in the fit storage device 30, and (iv) a fit system processor 36 connected to the fit storage device 30.

The fit system processor 36 can include one or more conventional central processing units. The fit system processor 36 is preferably capable of high volume processing.

The fit storage device 30 can include one or more magnetic disk drives, magnetic tape drives, optical storage units, CD-ROM drives, flash memory, cache memory and/or other types of memory devices. The fit storage device 30 may also contains a plurality of databases. For example, as illustrated in FIG. 2, the fit storage device 30 can include designer data, apparel data, and merchant data.

The fit operating system 32 includes web server and other related programs to keep and present web pages to the designer and the merchant for them to be able to log in and view, review and modify apparel data.

In the embodiment illustrated in FIGS. 1A and 2, the fit system operating system 32 and the fit system processor 36 utilize a fit network interface 12B to interface with (i) each customer 20 via a client 20A and customer network interface 20B, (ii) each merchant 22 via a merchant system 20A and merchant network interface 22B, and (iii) each apparel designer 24 via a designer system 24A and designer network interface 24B. Conventional internal or external modems may serve as the fit network interface 12B. In a preferred embodiment, the fit network interface 12B is connected to the merchant network interface 22B, the designer network interface 24B, and the customer network interface 20B with the Internet.

With reference to FIG. 2, the fit server program 40 includes a:

(i) A designer interface function 42 that enables the designer to display, enter and save apparel data.
(ii) A merchant interface function 44 that enables the merchant to review apparel data, enable entry of merchant data and an embed function that embeds the apparel data in a merchant web page in the merchant server.
(iii) A fit program function 46 that transfers to the client a fit program when the customer clicks a try-it-on button on the merchant web page.
(iv) A stat function 48 that receives and saves statistical data of date, time, merchant id, apparel brand, and apparel type in a database, when customer clicks the try-it-on button.

With reference to FIG. 7A, the operational steps of Fit server program are:

In step 700, on access from the apparel designer, serve apparel data form, receive and save apparel data in the fit system 12.

In step 702, on access from apparel merchant, serve selected apparel data and merchant interface function to enable entry of merchant data and embed apparel data in apparel_data ( ) function on merchant server web page.

In step 704, on execution of apparel_data ( ) function, receive and save date, time, merchant id, apparel brand, and apparel type in a statistical data file for each click of the try-it-on button.

In step 706, transfer the fit program to the client.

Designer Interface Function 42

The apparel designer 24 or alternatively an apparel manufacturer makes the apparel data available to the fit system 12 on the global computer network. In the preferred embodiment this is facilitated by an apparel data form that is made available to the designer on the global network enabling the designer to access the form on the fit system from anywhere and make the apparel data available to the fit system 12. To enable the apparel designer to provide apparel data, the apparel designer connects to the fit system and is presented a form as illustrated in FIG. 3A and FIG. 3B.

The form is viewable in two different formats, a summary format (FIG. 3A) and a detailed format (FIG. 3B). The fit system web page 300 is displayed when the designer connects to the fit system 12. The web page 300 enables the designer log in 302 using a user id and password.

The summary form 305 displays designer 306, brand name 308, apparel type 310, apparel gender 312, and the file Id 314. A create function 316 enables a new entry to be created and a detailed form 320 to be displayed. Alternatively, clicking the file id displays the form 320 (FIG. 3B) populated with existing apparel data. The summary format 305 enables the apparel data to be searched by designer, brand, gender and apparel id.

The detailed form 320 (FIG. 3B) collects apparel data from the designer. The apparel data may include items such as: file id 314, designer 306, brand 308, apparel type 310, apparel gender 310, number of colors 324, names of colors 326, number of sizes 328, names of sizes 330, one or more apparel images 322, apparel description 332, fabric 336 and apparel size and fit data 334. The apparel size and fit data 334 may include name of the size 340, its corresponding length or girth dimension 342, fit-range 344, for each of the dimension 346 of this size small 340.

Each dimension 340 of the apparel is coded or identified as either a girth or as length dimension. Each dimension is assumed default as girth, and each length dimension is distinguished and identified by an L. For example, the neck shoulder, chest, waist and arm are girth dimensions, where as Waist L and Arm L are length dimensions as illustrated 346.

For anyone, including the designer or the manufacturer, it is easy to measure the girth or length dimension of the apparel by laying it on a flat surface. In the FIG. 3B, for example, for apparel type equal to shirt, the dimensions 346 of neck, shoulder, chest, waist and arm are circumference dimensions that have been measured and recorded as girth 342. They are converted to circumference dimensions when computing fit indicators as described later. The shirt dimensions for waist length and arm length are distinguished as being identified as Waist L and Arm L 346 and are recorded as length dimensions 342, which are used as is when computing fit indicators as described later. The number and types of dimensions for the apparel depend upon the apparel type. For example, if the apparel type is shirt, the number and types of dimensions are specific to those required to judge the fit of a shirt.

An Update/Save button 348 enables the designer to update and or save the data in the fit system. Some of this apparel data is optional and some is required. The required apparel data is the (i) name of sizes 330, (ii) for each size, the fit dimensions 342. Other data is preferably used to facilitate the use of the fit system.

Apparel Data 52

With reference to FIG. 2, the apparel data 52 captured in the form 320 may be kept in the fit system 12 as an HTML page and catalogued by designer name, brand name and apparel type, as illustrated in FIG. 3A. Alternatively, the apparel data in the form 320 (FIG. 3B) may be kept as a database, and may be displayed as an HTML form to the designer and the merchant. The information technologies that enable the data to be kept in databases and displayed as a web page are prior art.

Merchant Interface Function 44

With reference to FIG. 3A, an apparel merchant 22 has access to the fit system 12 via web page 300, where the merchant can log in 304 and is displayed the summary form web page 305. Using the summary form, merchant may search and find apparel by apparel type, designer, and brand and decide if the merchant already sells the apparel or may decide to sell the apparel on his/her website. Merchant can open the apparel data form for the particular apparel by clicking the file id 314, and view the details of the apparel as identified in FIG. 3C.

FIG. 3C displays the apparel data form 350 which may display some of the existing apparel data of: file id 314, designer 306, brand 308, apparel type 308, apparel gender 310, number of colors 324, names of colors 326, number of sizes 328, names of sizes 330, one or more apparel images 322, apparel description 3332 and apparel fabric 336.

Additional fields in the form 350 are used for the merchant data. The fields: merchant name 352, inventory id 354, retail price 356 and web page 358, where the apparel is displayed or is intended to be displayed enable the merchant to specify the merchant specific data.

There is an action button called EMBED 360 which is linked to the execution of an embed function. The embed function (i) takes the apparel data from the apparel data forms 320 and 350 and creates parameters of a function called apparel_data( ), (ii) embeds that function in the merchant web page 400 (Refer to FIG. 4) where the apparel is displayed 402 and (iii) links the apparel_data function execution to a try-it-on button 404. The JavaScript code added to the merchant web page 400 is identified as 406.

Alternatively, the embed function creates the JavaScript code and displays in the web page 350 at the bottom of the page 362. The merchant then can copy/paste this code in the merchant web page 400 as illustrated in FIG. 4.

The apparel_data ( ) function code 408 is part of the merchant web page 400. Alternatively, the function code 408 for the apparel_data ( ) may be made available to the web page as a library function, by embedding a HTML library command in the merchant web page. When the customer loads the merchant web page, the library function is loaded as well. The library function may be accessed from the merchant system 22A or the fit system 12. The library function preferably is loaded from the fit system 12. Alternatively it may be loaded from the merchant server 22A.

FIG. 4 provides a simplified illustration of the merchant web page 400 after the execution of the Embed function as described above. The web page 400 displays the apparel data in box 402, which may include inventory id, price, image and description of apparel and a try-it-on link 404. The code embedded in the try-it-on link, and hidden from display to the customer is illustrated in box 406.

As an illustration, the variables whose values are contained in this JavaScript function are:

Merchant name=Acme
Apparel brand=Novelty
Apparel type=t-shirt
Apparel gender=male
Apparel image reference=http:/www.acme.com/images/shirt.jpeg
Apparel inventory id=N0001

Fabric=cotton
Number of sizes=4
First size name=small
Dimensions for first size='05.5-0.5-1.5;16.5-2.5-5.5;12.5-1.5-3.5;12.5-2.5-3.5;22.0-1.5-4.5;20.0-2.5-3.5'
Second size name=medium
Dimensions for the second size=,'05.5-0.5-1.5;16.5-2.5-5.5;12.5-1.5-3.5;12.5-2.5-3.5;22.0-1.5-4.5;20.0-2.5-3.5
Third size name=large
Dimensions for third size='05.5-0.5-1.5;16.5-2.5-5.5;12.5-1.5-3.5;12.5-2.5-3.5;22.0-1.5-4.5;20.0-2.5-3.5
Fourth size name=xlarge
Dimensions for the fourth size='05.5-0.5-1.5;16.5-2.5-5.5;12.5-1.5-3.5;12.5-2.5-3.5;22.0-1.5-4.5;20.0-2.5-3.5

As an illustration, for variable first size name with value of small, the next variable is dimensions for first size with a value of '05.5-0.5-1.5;16.5-2.5-5.5;12.5-1.5-3.5;12.5-2.5-3.5;22.0-1.5-4.5;20.0-2.5-3.5'. The value is a string of numerals that capture, the measured size of each dimension for small size, the lower fit range, and an upper fit range. For example, the first dimension is neck=05.5 and the lower fit range is 0.5 and upper fit range is 1.5 and similarly for other dimensions of shoulder, chest, waist and belly and length. Each parameter is enclosed in a single quote. To minimize the number of parameters, the dimensions are concatenated as one numeric string with dash and semicolon as separators.

The merchant web page 400 as shown in FIG. 4 also has the code for function apparel_data ( ) 408. The function code 408 is executed only when the customer clicks the button Try-it-on 404.

In summary, the apparel designer 24 may provide the apparel data 52 to the fit system 12 via the use of the apparel_data form 320. The merchant 22 accesses the apparel data 52 from the Fit system 12, via form 350 and provides merchant data such as merchant name, inventory identification, retail price, and web page name. Therefore, the merchant can review apparel at the fit system and choose those apparel that he already sells or intends to sell and enable the apparel data to be embedded on the web page next to the apparel as parameters of a function apparel_data( ).

As described earlier with reference to FIG. 3C, the embed function searches the specified web page by inventory id and price to determine if the apparel is already part of the web page, then it embeds the apparel_data function as identified in FIG. 4. If the embed function cannot find the apparel on the web page, then it creates the apparel display web page 400 using the data from the apparel data form. The apparel data in the form 320 including the merchant data in form 350 is embedded 406 for the apparel in the merchant web page 400. Additionally apparel data 402 including apparel image, apparel description, price and inventory identification may also be embedded for display on the web page 400.

As described in the next section on customer interface function, when the customer clicks the Try-it-on button 404 next to the apparel display on the merchant web page 400, the apparel data is saved in a cookie file called apparel_size in the customer's client, and customer is transferred to a Fit web page, where the apparel data from the apparel_size cookie is read into apparel size variables. These are then used in the Fit web page for comparison with the customer size variables.

Customer Interface Function and Fit Program 46

With reference to FIG. 4, the customer, when viewing a merchant apparel web page 400, sees an apparel information 402 he/she likes. The customer interface function and the Fit program enables the customer to click try-it-on link 404 and to be able to try on the apparel for size fit to determine which one of the available sizes is the best fit for the customer.

Customer interface function includes an apparel data function and a fit program. With reference to FIG. 7B, the apparel_data function when executed because the customer has clicked the try-it-on link next to the apparel display on the web page, does the following tasks:
  (i) Copies the apparel data into an apparel size cookie file in the client 710.
  (ii) Loads a fit program to the client, which is executed by the browser in the client 712.

With reference to FIG. 7C the fit program 46 does the following tasks:
  (i) The function 720: Checks the apparel type to determine male or female and initializes customer sizes from a default set of customer sizes or actual customer size data from previously created customer_size cookie file to customer_size variables.
  (ii) The function 722: Initialize default apparel size=small. Determine type of apparel and Compute Fit Parameters using default apparel size variables and customer size variables.
  (iii) The function 724: Display fit web page with features that are described in detail in this section. The features are:
    (1) default customer sizes within a form, with the ability to enter customer sizes and save via a cookie file 724A,
    (2) available apparel sizes in a drop down for customer selection 724B,
    (3) a fit preference choice in a drop down selection 724C,
    (4) a mini apparel image along with apparel brand 724D,
    (5) numerical and visual fit indicators have been computed using one of the apparel sizes displayed as a default selection and the default customer size 724E,
    (6) an animation base image (using Macromedia Flash application) of a male or female surrounded by numeric fit indicators and overlaid with visual color coded fit indicators 724F,
    (7) a fit button linked to a fit function 724G, and
    (8) a click button to return to the merchant web page to try on another apparel for size fit or purchase an apparel with the merchant checkout procedures 724H.
  (iv) The Function 726: When the customer changes the default customer sizes and clicks the fit button, the customer size variables are saved in a customer size cookie file in the client and the fit indicators are re-computed for the selected size and displayed as the animation image using Flash application program.

Features of the Fit Web page 501A and 501B

The eight features of the fit web page that are performed by the fit program 46 are described here with reference to FIGS. 5A and 5B.

Feature (1): One of the features of the fit web page displays a form for customer sizes with default sizes or sizes populated from customer_size cookie. Accept changes to customer size, if any, and save in customer_size cookie. This feature enables the customer to enter his/her sizes into the customer size form and save those sizes in a customer_size cookie kept in the client. Customer may also store customer size data by naming the cookie for different family members. The entry of customer size data is illustrated with reference to FIG. 5A.

FIG. 5A is a simplified illustration of a body image web page 501A that facilitates the entering and reviewing the customer size by the customer 20. The body image web page 501A includes data fields 534 for entering some of the body data that is specific to the customer. More specifically, the body image web page 501A includes an image surrounded by body size data fields.

The data fields 534H-534Z are spread on the screen for the different body segments. Each of the data fields 534H-534Z includes a header 544, a change-arrow 542 and the dimension itself 545. Clicking the header 544 opens a window 546 that shows how the dimensions can be measured. Clicking the change-arrows 542 increases or decreases the dimension. The customer, after seeing the standard images and the dimensions for the body data, may review and alter these dimensions.

Stated another way, the generic information in data fields 534H-534Z can be changed to the actual body data of the customer by adjusting the respective arrow 542 near the respective data field. More specifically, the generic body information of the customer can be customized to customer's specific body dimensions by clicking up and down on each arrow 542 until the data field matches the body data of the customer 545. For example, data field 534H illustrates that the generic information of the ankle diameter is 4.5. If the ankle diameter of the customer is 4.9, the customer can click the down arrow 542 until the data field 534H reads 4.9.

Importantly, the customer can modify one or more of the data fields 534H-534Z and click upon the SAVE AS button. The SAVE AS button 548 saves the customer size data in a cookie file in the client computer. Multiple cookie files one for each family member may be created and saved. The display has a feature, where the names of cookie files are displayed and a RESTORE AS function that enables the customer size data from a specified cookie to be loaded as customer size variables in the Fit program.

Feature (2): With reference to FIG. 5B, the Fit web page 501B displays the second feature, which displays all available apparel sizes with ability to select apparel size 560. This feature helps the customer select one of the available sizes of the apparel by the use of drop down box to try on for size fit.

Feature (3): Also display Fit options with the ability to select a Fit option 562. This feature enables the customer specify a fit option by a drop down box among choices as tight fit, loose fit and comfy fit.

Feature (4): With reference to FIG. 5B, the Fit web page 501B displays mini (reduced size) apparel image 570, apparel brand 572, and inventory ID 574. This feature helps the customer visually know which apparel is being tried on while seeing the Fit web page.

Feature (5): With reference to FIG. 5B, the Fit web page 501B Display a Flash program animation image 578 that is a composite of frames that include a base image 576 of generic male or female figure with or without the generic or actual image of the apparel and visual fit indicator frames 574, along with numerical fit indicators that include the length fit indicators 570 and girth fit indicators 572.

There are two types of dimensions that are applicable to an apparel, one is, length dimension and the other is and girth or circumference dimension. In the apparel data form, the data for circumference is provided as a diameter as it is easy to measure by the laying the apparel on a flat surface. When measuring customer size it is easy to provide the girth or circumference dimension as circumference is what the customer measures. When the customer judges the fitness or looseness of the apparel he/she judges it by the diameter. Hence the fit computations take the apparel data in the diameter measure, convert it to the circumference measure by multiplying it by 2.0 before comparing it with customer size data and then convert it back to diameter by dividing it by 2.0 and then rounded before for displaying the tightness or looseness for a girth dimension.

Computation of the fit variable that enables the computation of numerical, color, and shape of visual fit indicator parameters for entry into Flash Application program is described here. The apparel data that is made available to the fit web page from the apparel_size cookie is illustrated as follows with respect to one size and one dimension:

Apparel_gender=female
Apparel_type=shirt
Apparel_size=small
If (apparel_size=small) then the next three variables values are parsed from the dimensions for the first size.
Apparel_neck=05.5
Apparel_neck_fit_range_lower=0.5
Apparel_neck_fit_range_upper=1.5

The customer size for neck is obtained from the customer size data displayed on the customer size form 501A, which has been read from the customer size cookie file.

Customer_neck_size=16

The fit computations for this one dimension are illustrated as follows:

Neck_fit=(2.0×apparel_neck−customer_neck)/2 if (neckfit>Apparel_neck_fit_range_lower && neckfit<Apparel_neck_fit_range_upper)
neckfit=0
else if (neckfit<=Apparel_neck_fit_range_lower)
neckfit=neckfit−Apparel_neck_fit_range_lower
else if (neckfit>=Apparel_neck_fit_range_upper)
neckfit=neckfit−Apparel_neck_fit_range_upper The neckfit variable may be rounded to the next quarter inch.
if (neckfit=0) enable Flash program frame Display of Optimum Fit
if (neckfit<0) enable Flash program frame display of Tight Fit, numerical fit indicator=neckfit
if (neckfit>0) enable Flash Program frame display of Loose Fit, numerical fit indicator=neckfit This computes the numerical fit indicators. The visual fit indicators frames that are turned on may be further derived from the numerical fit indicators by the Flash program. These values of neckfit are used as input to the Flash program to control the display of the visual and numeric fit indicators that may be visually encoded by color or shape.

The visual fit indicators represent and show to the customer 20, how well one or more dimensions of article of wear will fit and/or feel on the body corresponding to the dimensions f the apparel being tried on. The visual fit indicators may be of different shapes, sizes and colors to represent a range of fit from very loose to very tight and be different for girth or length fit. For example, some visual indicators are illustrated in FIG. 6. These are meant for illustration and the visual indicator may be a any number of shapes and colors.

A customer may also specify a fit preference from skin fit, comfy, and loose choices. For each of these selections a variable fit_preference with a pre-defined value is added to the customer size at the time of the fit computations. For example the predefined values may be:
skinfit_value=0.0
comfy_value=0.5
loose_value=1.0

Where 0.0 is added to the customer size if the fit preference of skin fit is chosen, value of 0.5 is added if fit preference of comfy is chosen and a value of 1.0 is added if fit preference of loose is chosen. For example the fit preference may added to the fit computation as follows:

Neck_fit=(2.0×apparel_neck−(customer_neck+fit_preference)/2

The fit preference may be different for different body segments. For example, the above fit preference may be for neck. Then the fit computations are:

Neck_fit=(2.0×apparel_neck−(customer_neck+neck_fit_preference)/2

Feature (6): With reference to FIG. 5B, the Fit web page 501B displays Flash image made from a composite of frames that show customer image selected from a group of generic customer images based on apparel gender and visual fit indicators overlaid over the image and numerical fit indicators overlaid around the image.

Using the Flash program an image composite made up of a multiple image layers can be displayed where each layer can be individually positioned and made visible or invisible. The layers can be made visible or hidden based on values of variables that are dynamically determined by the Fit Program based on customer interactions in selecting the apparel size and fit preference.

The program Flash image layers can include layers (i) that display base customer generic image (ii) visual fit indicator layers that are overlaid or positioned upon the specific parts of the base image and (iii) numerical fit indicators that may be in layers that are placed around the base image. Tying the visual fit indicator layers to the fit computations can vary the color and or shape of the visual fit indicators and so can the numeric fit indicators can be made dependent upon the fit computations in color. For example optimum fit indicators can be displayed in green, loose fit indicators can be displayed in blue and tight fit indicators can be displayed in red color.

Furthermore the base generic customer image may itself be composed of layers that may include wireline male image, wireline female image, and wireline customer image with generic apparel that is being tried on. For example if a shirt is tried on the base image may be a wireline image of a generic customer clothed with a generic shirt. The generic apparel image may be the actual apparel image if such image is available. The variables from the apparel data variable enable the Flash program to dynamically determine which base customer image to enable to be visible and which to hide in the composite Flash image.

The Flash program that enables the Flash images to be defined and a Flash image composite created based on customer interactions or variables values in the program is commercially available from Macromedia and a Flash player or plug in to display such Flash movie or clips is included with the commercially used browsers such as Internet Explorer 4 and up.

The Flash program that may be used is codebase=http://download.macromedia.com/pub/shockwave/cabs/flash/swflash.cab#version=6,0,29,0 and pluginspage="http://www.macromedia.com/go/getflashplayer" type="application/x-shockwave-flash"

Feature (7): With reference to FIG. 5B, the Fit web page 501B displays a Size Fit button 566 to refresh page and redisplay the Flash image 578 with new selection of the apparel size 560 or the fit preference 562.

Feature (8): With reference to FIG. 5B, the Fit web page 501B display Return to Merchant button 564 that enables the customer to return to the merchant web pages to buy an apparel or select another apparel for size fit by clicking its try-it-on button.

Use of Cookies

In this invention cookie files are used as provided in commercial Windows operating system. Cookie files are files of limited size (1 Kbyte) that are stored in the temporary Internet file folder of the Windows operating system. These short cookie files are used to store apparel data and customer data either temporarily or permanently in the customer's client machine.

For example, the apparel data for the one apparel being tried on by the customer is saved in the apparel_data cookie temporarily so that the apparel data can be made available to the Fit web page without the need to link to a database server of the merchant or the Fit system. When the customer tries on another apparel for fit, that particular apparel data is then stored in the temporary cookie file. Additionally the customer size data that is provided by the customer on the Fit web page is also stored in a customer_size cookie file. The customer may specify different cookie files for different members of the family. Again the customer size data is stored in these cookie files in the customer's computer system without the need to store and make such data available to the merchant system or the Fit system.

The use of the cookie files is further illustrated here. When the customer clicks the try-it-on button, an apparel_data cookie file is created. When the web page 501A is presented to the customer by the Fit program, a cookie file containing default customer size data is created. The default customer size data is displayed to the customer on page 501A. The customer can change the data to his/her size, and then click the SAVE AS button after specifying the customer name. At that time a customer_name_customer size cookie is created. If the customer has done it once before, when the customer returns to web page 501A, the customer can specify the customer name and click the RESTORE AS button, which reads the customer size data from the cookie and populates the display as well as copy the size data into the default customer size cookie. When the customer leaves the web page 501A and transitions or is presented the web page 501B, the apparel_data cookie is read into apparel data variables and the default customer size data cookie is read into customer size variables. The apparel data variables and the customer size variables are then used to compute those fit indicators that are relevant for the apparel type as described earlier.

Although the present invention has been described in considerable detail with respect to certain preferred versions thereof, other versions are possible. For example, the fit system and the merchant system can be combined. Therefore, the spirit and scope of the appended claims should not be limited to the descriptions of the preferred versions contained herein.

What is claimed is:

1. A system for simulating apparel fit while maintaining customer privacy on a global computer network, comprising:
   a central server comprising a fit program stored thereon;
   a merchant computer system connected to a global computer network configured to transmit a plurality of web pages each displaying an apparel item for sale concurrently with a try-it-on button and comprising apparel size data associated with the apparel item stored thereon; and
   a client computer system connected to the global computer network comprising customer size data representing the physical dimensions of a customer's body stored thereon;
   wherein the client computer system is configured to:
      receive from the merchant computer system, the plurality of web pages;

select the try-it-on button of one of the plurality of the web pages via a mouse click; and in response to selecting the try-it-on button, retrieve the fit program from a central server, retrieve the apparel size data associated with the displayed apparel item; and execute the fit program;

wherein while executing the fit program, the client computer system is configured to:

use the customer size data stored on the client computer system to display a base human body image frame overlaid with visual fit indicator frame images using a Flash application;

use the apparel size data to display a plurality of available apparel size choices concurrently with the base human body image frame;

select an apparel size from the plurality of available choices; and dynamically alter the visual fit indicator frame images based on the apparel size data, customer size data, and selected size with the Flash application to display a simulation of how the selected size of the displayed apparel item would fit the customer's body;

wherein the client computer system is configured to receive the web pages, select the try-it-on button, and retrieve the apparel size data from the merchant computer system without establishing an account with the merchant computer system and without logging in to the merchant computer system.

2. The system of claim 1, wherein the apparel size data comprises:

apparel gender, apparel type, number of sizes, size identifications, dimensions for each size, and normal fit range for each size, and additionally optionally having merchant id, apparel image identification, apparel inventory identification, and apparel brand identification.

3. The system of claim 1, wherein the apparel size data comprises:

data including the identification of the sizes and for each size a set of length and girth dimensions relevant to fit on the human body; and data including for each length dimension of apparel a length range that is a normal fit for the apparel brand and for each girth dimension a girth range that is a normal fit for the apparel brand.

4. The system of claim 1, wherein the visual fit indicator frame images comprise:

color-coded layers of indicators from a group of, arches, arrows, boxes or shading overlaid over the body image to represent gradations of fit.

5. The system of claim 1, wherein while executing the fit program, the client computer system is further configured to:

enable the customer to modify body data to be saved in the customer size file for subsequent retrieval by the fit program.

6. The system of claim 1, wherein while executing the fit program, the client computer system is further configured to:

display a selection of a desired fit from a group of skintight, comfy, loose and very loose, which when selected, enables the fit display indicators to be adjusted.

7. The system of claim 1, wherein while executing the fit program, the client computer system is further configured to:

display a fit it button embedding a comparison function;

upon selection of the fit it button, execute the comparison function that compares the apparel size data and the customer size data, adjusts the comparison and refreshes the display with updated fit indicators.

8. The system of claim 1, wherein while executing the fit program, the client computer system is further configured to:

display an apparel image with brand name of the apparel being tried on.

9. The system of claim 1, wherein while executing the fit program, the client computer system is further configured to:

enable the customer to return to the merchant web pages to select another apparel item for trying on.

10. The system of claim 1, wherein the central server is further configured to:

upon selection of the try-it-on button by the client computer system, launch a stat function in a server, which tracks each button click, enabling the merchant computer system to know which apparel items are viewed more often than others and bill the merchant computer system for each button click.

11. The system of claim 1, wherein while executing the fit program, the client computer system is further configured to:

select, by the fit program, base human body image from a group of, a wire line image of a female, a wire line image of a male, an image of a female draped with apparel, and an image of a male draped with apparel.

12. The system of claim 1, wherein while executing the fit program, the client computer system is further configured to:

dynamically alter the visual fit indicator frame images to show only those frames that are specific to the fit of a specific apparel type based on parameter inputs to the Flash application.

13. The system of claim 1, wherein while executing the fit program, the client computer system is further configured to:

dynamically alter the visual fit indicator frame images, by the Flash application, based on fit parameter inputs to the Flash application, where the fit program computes the fit parameter inputs.

14. The system of claim 13, wherein while dynamically altering the visual fit indicator frame images, the client computer is further configured to:

alter the visual fit indicator frame images in color appearance based on fit color parameter inputs to the Flash application.

15. The system of claim 13, wherein while dynamically altering the visual fit indicator frame images, the client computer is further configured to:

alter the visual fit indicator frame images in shape appearance based on fit shape parameter inputs to the Flash application.

16. A method for simulating apparel fit while maintaining customer privacy on a global computer network, comprising:

storing, on a central server, a fit program;

storing, on a client computer system, customer size data representing the physical dimensions of a customer's body;

receiving, at the client computer system and from a merchant computer system connected via a global computer network, a plurality of web pages each displaying an apparel item for sale concurrently with a try-it-on button and storing apparel size data associated with the apparel item;

selecting, by the client computer system, the try-it-on button of one of the plurality of the web pages via a mouse click; and in response to selecting the try-it-on button, retrieving, by the client computer system, the fit program from the central server;

retrieving, by the client computer system, the apparel size data associated with the displayed apparel item; and executing, by the client computer, the fit program;

wherein executing the fit program comprises:
  using the customer size data stored on the client computer system to display a base human body image frame overlaid with visual fit indicator frame images using a Flash application;
  using the apparel size data to display a plurality of available apparel size choices concurrently with the base human body image frame;
  selecting an apparel size from the plurality of available choices;
  dynamically altering the visual fit indicator frame images based on the apparel size data, customer size data, and selected size with the Flash application to display a simulation of how the selected size of the displayed apparel item would fit the customer's body;
wherein the receiving the web pages, selecting the try-it-on button, and retrieving the apparel size data are performed without establishing an account with the merchant computer system and without logging in to the merchant computer system.

17. The method of claim 16, wherein the apparel size data comprises:
  apparel gender, apparel type, number of sizes, size identifications, dimensions for each size, and normal fit range for each size, and additionally optionally having merchant id, apparel image identification, apparel inventory identification, and apparel brand identification.

18. The method of claim 16, wherein the apparel size data comprises:
  data including the identification of the sizes and for each size a set of length and girth dimensions relevant to fit on the human body; and
  data including for each length dimension of apparel a length range that is a normal fit for the apparel brand and for each girth dimension a girth range that is a normal fit for the apparel brand.

19. The method of claim 16, wherein the visual fit indicator frame images comprise:
  color-coded layers of indicators from a group of, arches, arrows, boxes or shading overlaid over the body image to represent gradations of fit.

20. The method of claim 16, wherein executing the fit program further comprises:
  enabling the customer to modify body data to be saved in the customer size file for subsequent retrieval by the fit program.

21. The method of claim 16, wherein executing the fit program further comprises:
  displaying a selection of a desired fit from a group of skintight, comfy, loose and very loose, which when selected, enables the fit display indicators to be adjusted.

22. The method of claim 21, wherein executing the fit program further comprises:
  displaying a fit it button embedding a comparison function;
  upon selection of the fit it button, executing the comparison function that compares the apparel size data and the customer size data, adjusts the comparison and refreshes the display with updated fit indicators.

23. The method of claim 16, wherein executing the fit program further comprises:
  displaying an apparel image with brand name of the apparel being tried on.

24. The method of claim 16, wherein executing the fit program further comprises:
  enabling the customer to return to the merchant web pages to select another apparel item for trying on.

25. The method of claim 16, further comprising:
  upon selection of the try-it-on button, launching a stat function in a server, which tracks each button click, enabling the merchant computer system to know which apparel items are viewed more often than others and billing a merchant each button click.

26. The method of claim 16, wherein executing the fit program further comprises:
  selecting, by the fit program, base human body image from a group of, a wire line image of a female, a wire line image of a male, an image of a female draped with apparel, and an image of a male draped with apparel.

27. The method of claim 16, wherein executing the fit program further comprises: dynamically altering the visual fit indicator frame images to show only those frames that are specific to the fit of a specific apparel type based on parameter inputs to the Flash application.

28. The method of claim 16, wherein executing the fit program further comprises:
  dynamically altering the visual fit indicator frame images, by the Flash application, based on fit parameter inputs to the Flash application, where the fit program computes the fit parameter inputs.

29. The method of claim 28, wherein the step of dynamically altering the visual fit indicator frame images further comprises:
  altering the visual fit indicator frame images in color appearance based on fit color parameter inputs to the Flash application.

30. The method of claim 28, wherein the step of dynamically altering the visual fit indicator frame images further comprises:
  altering the visual fit indicator frame images in shape appearance based on fit shape parameter inputs to the Flash application.

* * * * *